Nov. 7, 1961 T. L. BEELER 3,008,088

SYNCHRONIZED MULTIVIBRATOR WITH SELECTABLE CLAMPING MEANS FOR RENDERING IT INOPERATIVE

Filed Nov. 7, 1957

INVENTOR
T. L. BEELER
BY Walter M. Hill
ATTORNEY 3,008,088

SYNCHRONIZED MULTIVIBRATOR WITH SELECTABLE CLAMPING MEANS FOR RENDERING IT INOPERATIVE

Theodore L. Beeler, Whippany, N.J., assignor to Bell Telephone Laboratories, Incorporated, New York, N.Y., a corporation of New York Filed Nov. 7, 1957, Ser. No. 695,050
6 Claims. (Cl. 328—200)

This invention pertains to pulse generation, and particularly to the generation of synchronized pulses during controlled time intervals.

The operation of many electronic systems, including radar, pulse communication and television, involves generation of recurring series of substantially rectangular pulses which occur in precise time relationship with a supplied series of synchronizing pulses. A widely used pulse generator capable of such synchronized operation is the multivibrator. This comprises a pair of amplifiers which are so connected that when either assumes one of two opposite operating states the other amplifier assumes the opposite state. A detailed description of both astable and monostable multivibrators, and the manner in which each may be controlled by synchronizing pulses, is presented in chapter 9 of the textbook "Recurrent Electrical Transients" by Von Tersch and Swago, published in 1953 by Prentice-Hall, Inc. Bistable multivibrators, also known as "trigger circuits," are described in chapter 8 of the same reference.

While synchronized multivibrators perform satisfactorily when operated continuously, it is difficult to achieve intermittent operation over controlled time intervals without disturbing the precision of the time relationship between the multivibrator output pulses and the synchronizing pulses. If a disabling voltage is initially applied to the multivibrator to prevent it from operating in response to a continuous series of synchronizing pulses, and then is suddenly removed in order to permit such response to subsequently occurring pulses in the series, the consequent disturbance at either time is often itself sufficient to cause the multivibrator amplifiers to reverse their operating states. This would result in production of false output pulses at times completely independent of any synchronizing pulses. It is possible in some multivibrators to prevent such erroneous behavior by very carefully adjusting the magnitude of the disabling voltage to a level at which it will be adequate to prevent response to synchronizing pulses but will not appreciably disturb the multivibrator amplifiers when it is removed. However, maintenance of such a critical adjustment necessitates auxiliary circuitry for stabilizing the disabling voltage, the amplitude of the synchronizing pulses, and all voltage levels within the multivibrator itself.

Accordingly, an object of the invention is to provide means for controlling the operation of a synchronized multivibrator without disturbing the time relationship between the multivibrator output pulses and the synchronizing pulses.

A further object is to provide means for so disabling a multivibrator over controlled time intervals that during those intervals its output will remain substantially constant in spite of the continued application of synchronizing pulses thereto.

A further object is to provide means whereby the magnitude of a clamping voltage for controlling the intervals of operation of a synchronized multivibrator may be permitted to vary over a substantial range without causing the multivibrator to produce spurious output pulses.

The invention is applicable to any of the conventional types of multivibrators comprising a pair of amplifiers wherein each amplifier has at least one input and one output terminal and at least one output terminal of each amplifier is cross connected to an input terminal of the other amplifier to form a regenerative feedback circuit. In accordance with the invention, voltage responsive switching means are provided for respectively connecting an output terminal and an input terminal of one of the amplifiers to a source of voltage which may be set at either a disabling level or an enabling level. When the source of voltage is set at its disabling level, it renders the switching means conductive which in turn applies a clamping voltage to these two terminals. The clamping voltage applied to the output terminal causes both amplifiers to assume their respective operating states to more extreme degrees, thus preventing a multivibrator operation when a synchronizing pulse is applied to the multivibrator. However, because of a cross-coupling connection between the amplifiers, the clamping voltage applied to the output terminal of the first amplifier causes the potential level on an input terminal of the remaining amplifier to change. When this cross-coupling connection includes a capacitor, the initial change in this potential level tends to cause the multivibrator to change state. The clamping voltage applied to the input terminal of the first amplifier prevents this regenerative process from taking place. Therefore, the present invention disables a multivibrator so that not only does it not respond to synchronizing pulses but false outputs produced as a result of the disabling action are prevented.

A detailed description of a preferred embodiment of the invention is presented in the ensuing specification with reference to the accompanying drawings, in which.

Figure 1:
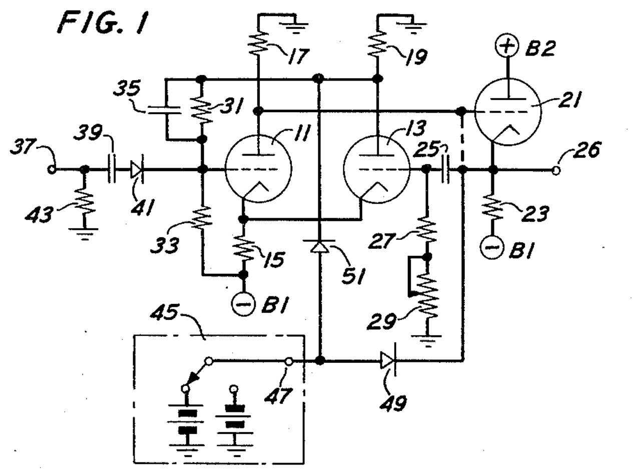
FIG. 1 is a circuit drawing of a synchronized multivibrator which is controlled in accordance with the invention.

The particular multivibrator shown in FIG. 1 is of the monostable cathode-coupled type, and comprises a pair of vacuum tube amplifiers 11 and 13 which each have at least one input terminal and at least one output terminal. Amplifier 11 receives an input voltage at its cathode from the cathode of amplifier 13. As described in more detail hereinafter, it also receives synchronizing pulses at its grid. The cathode and the grid of amplifier 11 are therefore both input terminals. The output of amplifier 11 is produced at its anode, which will therefore be denoted the output terminal. A capacitor 25 couples input pulses to the grid of amplifier 13. The input side of capacitor 25 will therefore be considered as the input terminal of this amplifier. The output of amplifier 13 is produced at both its cathode and its anode, both of which will be denoted the output terminals. This terminology is employed to make it clear that while vacuum tubes are employed in the circuit of FIG. 1 the invention is equally applicable to amplifying devices of any type suitable for use in a multivibrator circuit and which have the kind of operating characteristics specified below.

The cathodes of amplifiers 11 and 13 are connected in common by a resistor 15 to a source B1 of negative potential with respect to ground. Their anodes are respectively connected to ground by resistors 17 and 19. The anode of amplifier 11 is further connected to the grid of a third vacuum tube amplifier 21 serving as a cathode follower. The cathode of amplifier 21 is connected by a resistor 23 to source B1, and is further connected to the grid of amplifier 13 by capacitor 25. Pulses produced at the cathode of amplifier 21 constitute the output of the multivibrator, and are available at terminal 26 connected thereto. The anode of amplifier 21 is connected to a source B2 of positive potential with respect to ground.

The grid of amplifier 13 is connected to ground by a resistor 27 and rheostat 29 in series. The grid of amplifier 11 is connected to the junction of a pair of resistors 31 and 33 which are in series between the anode of amplifier 13 and source B1. A small capacitor 35 is connected in shunt with resistor 31 to speed up the rate at which the operating states of amplifiers 11 and 13 may be interchanged.

With the circuit in steady state operation, amplifier 13 conducts sufficient current between its anode and cathode to produce a voltage drop across cathode resistor 15 which maintains amplifier 11 nonconductive. In that operating condition amplifier 13 also conducts current between its grid and cathode, so that the voltage at its grid is substantially at the same level as that at its cathode and follows changes in cathode voltage. Since amplifier 11 is nonconductive, the voltage at its anode, and so the voltage at the grid of amplifier 21 connected thereto, is at ground level. This causes amplifier 21 to conduct, producing a small positive voltage $E_k$ at its cathode and at output terminal 26.

Positive synchronizing pulses are applied to the multivibrator input terminal 37, which is connected to the grid of amplifier 11 by a coupling capacitor 39 and diode 41 in series, diode 41 being poled to conduct in a direction toward the grid. Multivibrator input terminal 37 is also connected to ground by an input resistor 43, which stabilizes the input impedance of the circuit. Each synchronizing pulse is coupled by capacitor 39 and diode 41 to the grid of amplifier 11, tending to cause the latter to conduct slightly. Assuming that the clamping voltage described hereinafter is at a level at which the multivibrator is enabled to operate, amplifier 11 will conduct and the voltage at its anode will drop. This reduces the voltage at the grid of amplifier 21, and so also the voltage at its cathode. Since the charge on capacitor 25 cannot change instantaneously, this voltage drop will be coupled to the grid of amplifier 13 and causes that triode to conduct slightly less current. Because any voltage variation applied to amplifier 11 is amplified before being applied to amplifier 13, the voltage drop at the grid of amplifier 13 tending to decrease the current therein has a greater effect than the voltage at the grid of amplifier 11 tending to cause it to conduct. Consequently, the total current in resistor 15 is reduced, reducing the voltage at the cathode of amplifier 11. This causes increased conduction of that amplifier, so that a regenerative interchange of the operating states of amplifiers 11 and 13 occurs which terminates with amplifier 11 conducting and amplifier 13 nonconducting. The rate of this regenerative process is further increased by applying the potential change on the anode of amplifier 13 to the grid of amplifier 11 through the feedback path comprising capacitor 35. This process is completed a very short time following the synchronizing pulse, and results in a sharp drop in the voltage level at multivibrator output terminal 26. It may be noted that diode 41 is back-biased by the voltage rise at the anode of amplifier 13 when that amplifier becomes nonconducting. That voltage rise is therefore efficiently coupled to the grid of amplifier 11 by resistor 31 and capacitor 35, without being dissipated in the impedance of the synchronizing pulse source or in resistor 43.

The major function of amplifier 21 is to improve the efficiency with which a voltage change at the anode of amplifier 11 is transmitted to the grid of amplifier 13 to render it nonconducting. That is, while amplifier 13 is conducting its grid has a very low input impedance and the anode of amplifier 11 has a higher impedance. Amplifier 21 serves to match these impedances, so that the described regenerative operation whereby amplifier 13 becomes non-conducting and amplifier 11 becomes conducting occurs very rapidly. A sharp drop in the level of the voltage at multivibrator output terminal 26 is thereby produced substantially simultaneously with the synchronizing pulse which initiates that operation.

The operating condition wherein amplifier 13 is nonconducting and amplifier 11 is conducting cannot last indefinitely, since the negative voltage step which was conducted by capacitor 25 to the grid of amplifier 13 to effect that operating state eventually results in capacitor 25 discharging via the path from ground through rheostat 29, resistor 27, and the cathode of amplifier 21. As its charge changes, the potential at its left-hand electrode rises toward ground level, and so eventually brings up the voltage of the grid of amplifier 13 to a value at which that amplifier begins to conduct. The resultant increase in current through cathode resistor 15 raises the voltage of the cathode of amplifier 11, reducing the degree to which that amplifier is conducting. The voltage at the anode of amplifier 11 thereby increases, resulting in an increase in the voltages at the grid and cathode of amplifier 21. The latter voltage rise is coupled by capacitor 25 to the grid of amplifier 13, increasing the degree to which that amplifier is conducting. The change in potential on the anode of amplifier 13 is applied to the grid of amplifier 11 by way of capacitor 35, thereby increasing the regenerative process. A reverse regenerative operation thus occurs which restores the original steady state condition wherein amplifier 13 is conducting and amplifier 11 is nonconducting. The voltage at multivibrator output terminal 26 again steps up to the level from which it had been reduced when amplifier 11 became conducting, and capacitor 25 discharges rapidly through the grid-to-cathode path of amplifier 13. The multivibrator is then back in its initial state, completing a cycle of operation in response to the synchronizing pulse.

The voltage waveform at multivibrator output terminal 26 consists of a succession of rectangular negative pulses which are each initiated simultaneously with a synchronizing pulse and which terminate after a time equal to that in which amplifier 13 reverts to the conducting state after having been rendered nonconducting. This time may be controlled by adjusting rheostat 29, and, of course, must be set to a value less than the interval between successive synchronizing pulses.

In accordance with the present invention, a multivibrator is disabled by applying a clamping voltage to several places within the multivibrator. This is accomplished in the arrangement of FIG. 1 through the use of a source of voltage 45 and a pair of diodes 49 and 51. An output terminal 47 of source 45 is connected by diode 49 to the right-hand electrode of capacitor 25, and by diode 51 to the anode of amplifier 13. Each diode is poled to conduct in a direction away from source 45, which is adapted to produce either a positive or a negative voltage relative to ground, the level of each being adjustable. The output impedance of source 45 is very low, so that the voltage it produces remains substantially constant regardless of the conditions at the circuit elements to which it is applied. For this reason, that voltage serves as a "clamping" voltage. A great variety of means for performing this function is known, including electronic circuits which are adapted to rapidly respond to varying controlling signals. A simple illustrative arrangement is shown in FIG. 1 as comprising a pair of batteries having very low internal impedances. One battery is grounded at its positive terminal and the other at its negative terminal, the remaining terminals being respectively connected to the two contacts of a single-pole double-throw switch. The pole of the switch is connected to terminal 47. Depending upon which way the switch is thrown, either a positive or negative clamping voltage can be produced at that terminal. As illustrated, a positive clamping voltage is being produced.

During the steady state, the anode of tube 13 is negative to ground. When the positive clamping voltage is applied through diode 51 to the anode of amplifier 13, its potential is suddenly raised to the clamping level so that a greater current is caused to flow through this amplifier, thereby increasing the voltage drop across resistor 15. This increased voltage drop across resistor 15 applies a greater bias to amplifier 11. In other words, both amplifiers are caused to assume their steady operating states to more extreme degrees. The increased bias on amplifier 11 is sufficient to render it unresponsive to the synchronizing pulses applied to terminal 37, thus preventing a multivibrator action in response to the synchronizing pulses.

Figure 2:
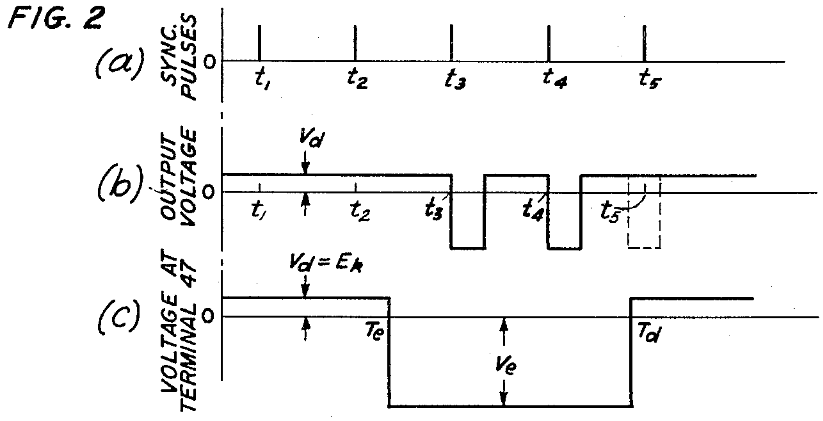
FIG. 2 is a series of waveform charts illustrating the time relationships between various voltages involved in the operation of the circuit of FIG. 1.

The positive clamping voltage applied to the anode of amplifier 13 is coupled by way of the speed-up capacitor 35 to the grid of amplifier 11. The waveform appearing on the grid of amplifier 11 as a result of this speed-up action is a positive exponential spike. This spike is of sufficient amplitude to be passed by amplifier 11 and applied as a negative-going spike to amplifier 13. In the absence of diode 49, this spike would produce a false output by causing the multivibrator to complete a regenerative process. The operation is depicted in the charts shown in FIG. 2 wherein chart (*a*) shows the waveform of the synchronizing pulses, chart (*b*) shows the waveform of the output voltage at terminal 26, and chart (*c*) shows the waveform of the source 45 voltage at terminal 47.

As shown in chart (*c*) the amplitude of the clamping or disabling voltage $V_d$ is made equal to the cathode voltage $E_k$ of amplifier 21 when the multivibrator is in its standby or steady state. The enabling voltage $V_e$ is sufficiently negative to backbias diodes 49 and 51. The synchronizing pulses occurring at times $t_1$ and $t_2$ do not cause the multivibrator to change state because the clamping voltage $V_d$ applied to the anode of amplifier 13 results in amplifier 11 being sufficiently biased so that it is unresponsive to these pulses.

At time $T_e$ the source 45 is switched to its enabling level $V_e$. When the positive clamping voltage $V_d$ is thus removed from the anode of amplifier 13, the plate current is decreased, thereby removing enough of the bias on amplifier 11 so that the synchronizing pulses occurring at times $t_3$ and $t_4$ may each cause the multivibrator to change state to produce the two negative-going square waves shown in FIG. 2(*b*).

At time $T_d$ the disabling or clamping voltage $V_d$ is again applied. In the absence of diode 49, the aforementioned positive exponential voltage spike which passes through the coupling provided by capacitor 35, would immediately cause a regenerative cycle to occur, to thereby produce the false pulse output shown by the broken lines in chart (*b*) at time $T_d$. Diode 49, however, prevents this false pulse output from occurring by clamping the input terminal of amplifier 13 to a voltage level substantially equal to $E_k$. Because of the relatively low forward resistance of diode 49 and the low internal resistance of source 45, the exponential spike passed by amplifier 11 actually does appear as an ineffectively small negative-going spike at output terminal 26 at time $T_d$. This cannot be shown in chart (*b*) because of the false pulse there shown; however, this small, negative-going spike appears in chart (*d*) of FIG. 3.

Figure 3:
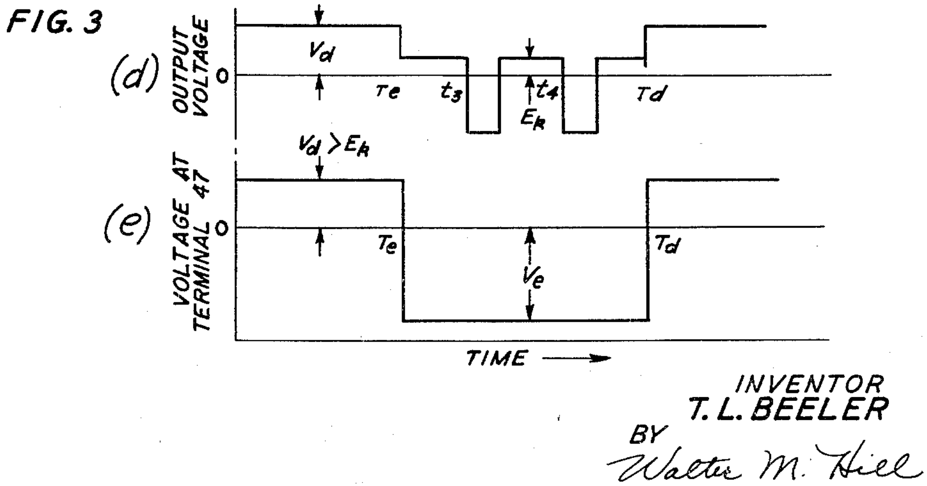
FIG. 3 is a series of waveform charts illustrating the operating voltage conditions when a larger disabling voltage is used.

The disabling voltage $V_d$ may be more or less than $E_k$, although it is preferable to have $V_d$ approximately equal to $E_k$ as this causes less change in the charge on capacitor 25 to take place during the disabling intervals. When, however, $V_d$ is greater or less than $E_k$ the output voltage appearing at terminal 26 will have a slightly different waveform. Chart (*d*) of FIG. 3 shows the waveform of the voltage at terminal 26 when the voltage $V_d$ is greater than the voltage $E_k$.

Amplifier 21 serves several functions. As stated previously it helps to match the high anode impedance of amplifier 11 in its nonconducting state to the much lower grid impedance of amplifier 13 in its conducting state. This amplifier also provides a low impedance circuit to ground for the input side of capacitor 25 so that the time constant of the circuit comprising capacitor 25 and resistor 27 and rheostat 29 is determined independently of any other components. Furthermore, this amplifier provides a low impedance output for the multivibrator circuit. However, it has been ascertained that the circuit performs substantially as described if amplifier 21 is omitted and a direct connection is made between the anode of amplifier 11 and the input side of capacitor 25 as shown by the broken line in FIG. 1. When such a direct connection is made, amplifier 21, its potential sources B1 and B2, and resistor 23 may be omitted.

While the invention has been specifically described with reference to the embodiment thereof illustrated in FIG. 1, it will be clear to those skilled in the art of pulse generation that many modifications are possible without departing from the scope and teachings of applicant's invention. For example, by providing a by-pass capacitor across cathode resistor 15, and eliminating resistor 31, the illustrated monostable multivibrator may be arranged to function as a synchronized astable multivibrator. Other obvious modifications will permit operation as a bistable multivibrator responsive to the synchronizing pulses.

What is claimed is:

1. A gated multivibrator comprising a pair of amplifiers each having at least one input circuit and one output circuit, means coupling at least one input circuit of each amplifier to an output circuit of the other amplifier to form a regenerative circuit wherein one of the amplifiers is in a conducting state and the other is in a nonconducting state, at least one of said coupling means including a capacitor, means for applying a source of synchronizing pulse voltages to one of said input circuits, a clamping voltage source, and direct current paths including switching means for connecting said clamping voltage source to an input circuit and to an output circuit of one of said amplifiers to cause both of said amplifiers to assume their operating states to more extreme degrees and to render said multivibrator unresponsive to said synchronizing pulse voltages.

2. A gated multivibrator comprising a pair of amplifiers each having at least one input circuit and one output circuit, means coupling at least one input circuit of each amplifier to an output circuit of the other amplifier to form a regenerative circuit wherein one of the amplifiers is in a conducting state and the other is in a nonconducting state, at least one of said coupling means including a capacitor, means for applying synchronizing pulse voltages to one of said input circuits, a source adapted to selectively produce a clamping voltage which when applied to an output circuit of one of said amplifiers causes both amplifiers to assume their respective operating states to more extreme degrees, a first unidirectionally conductive means, direct current conducting means connecting said first unidirectionally conductive means between said source and said one amplifier output circuit and poled in a direction to apply said clamping voltage to said one amplifier output circuit, a second unidirectionally conductive means, and direct current conducting means connecting said second unidirectional conductive means between said source and an input circuit of said one amplifier and poled in the same sense with respect to said source as said first unidirectionally conductive means.

3. A gated multivibrator comprising a first amplifier having one input and two output circuits, a second amplifier having two input and one output circuits, means coupling said first amplifier input circuit to said second amplifier output circuit, means coupling said second amplifier input circuits to respective ones of said first amplifier output circuits to form a regenerative circuit wherein at any one time one of the amplifiers is in a conducting state and the other is in a nonconducting state, at least one of said coupling means including a capacitor, means for applying synchronizing pulse voltages to one of said second amplifier input circuits, a source adapted to be selectively switched between two voltage levels where the voltage at one level comprises a clamping voltage which when applied to a first output circuit of said first amplifier causes said amplifiers to assume their respective operating states to more extreme degrees, a first diode, direct current conducting means connecting said first diode between said source and said first output circuit and poled in a direction to apply said clamping voltage to said first output circuit, a second diode, and direct current conducting means connecting said first diode between said source and said first amplifier input terminal and poled in the same sense with respect to said source as said first diode.

4. In combination with a gated multivibrator comprising a pair of amplifiers each having at least one input circuit and one output circuit and means coupling at least one input circuit of each amplifier to an output circuit of the other amplifier to form a regenerative circuit wherein one of the amplifiers is in a conducting state and the other is in a nonconducting state, at least one of said coupling means including a capacitor, a disabling circuit comprising a source for supplying a clamping voltage which when applied to an output circuit of one of said amplifiers causes both amplifiers to assume their respective operating states to more extreme degrees, and direct current paths including switching means for applying said clamping voltage to both an input circuit and said output circuit of said one amplifier.

5. In combination with a gated multivibrator comprising a pair of amplifiers each having at least one input circuit and one output circuit and means coupling at least one input circuit of each amplifier to an output circuit of the other amplifier to form a regenerative circuit wherein one of the amplifiers is in a conducting state and the other is in a nonconducting state, at least one of said coupling means including a capacitor, a disabling circuit comprising a source adapted to be switched to supply a clamping voltage which when applied to an output circuit of one of said amplifiers causes both amplifiers to assume their respective operating states to more extreme degrees, and direct current paths for applying said clamping voltage to an input and said output circuit of said one amplifier.

6. A gated multivibrator comprising a pair of amplifiers each having at least one input circuit and one output circuit, means coupling at least one input circuit of each amplifier to an output circuit of the other amplifier to form a regenerative circuit wherein one of the amplifiers is in a conducting state and the other is in a nonconducting state, at least one of said coupling means including a capacitor, means for applying synchronizing pulse voltages to one of said input circuits, a source for producing a clamping voltage of a predetermined duration, and means for applying said clamping voltage to an input circuit and to an output circuit of one of said amplifiers throughout said predetermined duration to cause both of said amplifiers to assume their operating states to more extreme degrees and to render said multivibrator unresponsive to said synchronizing pulse voltages.

References Cited in the file of this patent

UNITED STATES PATENTS

| | | |
|---|---|---|
| Re. 23,770 | Bergfors | Jan. 12, 1954 |
| 2,495,826 | Schock | Jan. 31, 1950 |
| 2,524,134 | Palmer | Oct. 3, 1950 |
| 2,540,539 | Moore | Feb. 6, 1951 |
| 2,545,924 | Johnstone | Mar. 20, 1951 |
| 2,687,473 | Eckert et al. | Aug. 24, 1954 |
| 2,764,343 | Diener | Sept. 25, 1956 |
| 2,784,309 | Sable | Mar. 5, 1957 |
| 2,802,940 | Burton | Aug. 13, 1957 |